3,467,481
METHOD OF DYEING POLYETHYLENE TEREPHTHALATE POLYMER FILMS, STRANDS AND YARNS
Robert M. Gold, Brooklyn, N.Y., assignor to Keuffel & Esser Company, Hoboken, N.J., a corporation of New Jersey
No Drawing. Filed Oct. 23, 1964, Ser. No. 406,187
Int. Cl. D06p *3/00, 5/00*
U.S. Cl. 8—4                                3 Claims

ABSTRACT OF THE DISCLOSURE

Polyester materials are permanently dyed by wetting with a solution of a chloroacetic acid, drying at a temperature of less than about 150° F., coating with a solution of polymer at ambient temperature, and drying at a temperature above about 150° F.

---

The present invention relates to dyeing processes, and refers more particularly to processes for dyeing polymers.

Generally very strenuous conditions are required for dyeing polymers such as polyethylene terephthalate because of their relative chemical stability. For example, it has been necessary to boil a dye solution in order to color the polymer film, strand, or yarn.

Now it has been found by means of the present invention that dyeing may be accomplished under less strenuous conditions by coating a surface modifier on the polymer, drying at preferred temperatures, dyeing from a solution at ambient temperature, and drying at temperatures higher than the previous preferred drying temperatures.

Therefore, one object of the present invention is to provide methods for dyeing polymers, which overcome the disadvantages of the prior art.

Another object is to provide a method for dyeing polymer films, strands, and yarns normally not receptive to dye without very strenuous conditions.

Another object is to provide a method of dyeing polyethylene terephthalate film.

Other objects will become apparent during the course of the following specification.

The objects of the present invention may be realized by treating the polymer with a surface modifier, drying at relatively low temperatures, dyeing the polymer with a dye solution at ambient temperatures and drying at a relatively higher temperature to produce a permanently dyed polymer.

The following examples further illustrate the present invention and is not intended to limit the scope of the inventive concept.

A polymer such as polyethylene tetraphthalate polyester film was dipped in a solution of 5% trichloroacetic acid in toluene. The film was then dried at as low a temperature as possible, preferably below 150° F. The acid treated film was then dipped in a solution of 5% Oil Red O dye (CI 26125) in heptane at ambient temperatures. The film was dried in an oven at temperatures preferably higher than 150° F. for a time interval of 30 seconds or longer. Upon removal from the oven, the dye on the film was found to be permanently fixed. Solvent such as heptane was no longer able to remove the dye from the film, but the dye was still removable to some degree with a stronger solvent such as toluene or ethylene dichloride where this was desirable.

The polymer may be in the form of a film, strand, pellets, twisted strands, yarns or fabric. The surface must be wet with the surface modifier solution. Polymers which were found to be readily dyeable by the present process were polyethylene terephthalate, polypropylene, polyethylene, polyamide and acrylic polymers. Suitable surface modifiers were trichloroacetic acid, dichloroacetic acid, monochloroacetic acid, phenol, cresol, and benzyl alcohol.

It was found that a compatible polymer may be incorporated in the dye solution to produce desired effects such as gloss, abrasion, and water-sensitivity. For example, the use of gelatin plus dye in a suitable solvent provided a hydrophilic colored surface.

Other suitable dyes were Brilliant Oil Blue BMA (CI Solvent Blue 16), Rhodamine B (CI 45170), Azosol Fast Red BE (CI 12715), Azo Oil Blue-Black B (CI Solvent Black 12), Oil Brown Y (CI Solvent Orange 30 and 31), Oil Yellow ENC (CI 11021), Aviation Oil Blue (CI Solvent Blue 58) and Latyl Violet BN (CI Disperse Violet 27). Combinations of these dyes may be used.

It was found that dyes could be mixed before application to the film and that the dyes could be added successively to the film, but where subsequent dyeing was desired, heating of the film with the initial dye was preferably restricted to temperatures below 200° F.

Suitable solvents for the dye included heptane, ethyl alcohol, toluene, and ethylene dichloride. The nature of the solvent was relatively immaterial, execpt that by proper selection of the solvent, some control over the intensity and depth of the dyeing was provided. Solvents which diffused into the acid-treated films readily carried the dye in more deeply than solvents which did not diffuse into the film as readily.

Many types of designs and decorations on polymer film supports were possible. By additive operations, uniform coloring of the film may be followed by adding a second color imagewise by the present method. The converse step may also be accomplished with an initial image coloration step followed by a second uniform coloration step. The number of colorations and types is unlimited.

The colored films thus prepared are applicable in the graphic arts, decorative trades, photography, and in the copying field.

It is apparent that the described examples are capable of many variations and modifications. All such variations and modifications are to be included within the scope of the present invention.

What is claimed is:
1. A method of dyeing polyethylene terephthalate polymer films, strands and yarns, which comprise the steps of:
   wetting the surface of said polyethylene terephthalate polymer with a surface modifier selected from the group consisting of trichloro-acetic acid, dichloroacetic acid, monochloroacetic acid,
   heating said polymer at a temperature less than about 150° F. without driving the modifier from the surface thereof;
   coating said polymer with a dye solution at ambient temperature; and
   drying said coated polymer at a temperature higher than about 150° F. to produce permanently-dyed polymer.
2. A method in accordance with claim 1 wherein said dye solution comprises a dye selected from the group consisting of Oil Red O (CI 26125), Rhodamine B (CI 45170), Azosol Fast Red BE (CI 12715), Oil Yellow ENC (CI 11021).
3. A method of dyeing polyethylene terephthalate film, which comprises the steps of:
   wetting said film uniformly with a dilute solution of trichloroacetic acid;
   drying said film at a temperature less than about 150° F. to remove the solvent without driving the acid from the surface of said film;

applying a solution of dye uniformly to said film at ambient temperature; and drying the dyed film at a temperature higher than about 150° F. to produce a uniformly and permanently-dyed film.

References Cited

UNITED STATES PATENTS

| | | | |
|---|---|---|---|
| 2,548,853 | 4/1951 | Baker | 8—4 |
| 3,034,847 | 5/1962 | Chapman | 8—4 |
| 3,169,043 | 2/1965 | Baumgartner | 8—4 |
| 3,275,400 | 9/1966 | Bonitz et al. | 8—4 |
| 3,305,603 | 2/1967 | McIntyre et al. | 8—55 X |
| 3,307,900 | 3/1967 | Nakanome et al. | 8—4 |
| 2,957,745 | 10/1960 | Broun et al. | 8—55 |

GEORGE F. LESMES, Primary Examiner

T. J. HERBERT, Jr., Assistant Examiner

U.S. Cl. X.R.

8—55